US008560747B1

(12) United States Patent
Tan et al.

(10) Patent No.: US 8,560,747 B1
(45) Date of Patent: Oct. 15, 2013

(54) ASSOCIATING HEARTBEAT DATA WITH ACCESS TO SHARED RESOURCES OF A COMPUTER SYSTEM

(75) Inventors: Yuen-Lin Tan, Pacifica, CA (US);
Satyam Vaghani, San Jose, CA (US);
Dragan Stancevic, Colbert, WA (US);
Abhishek Rai, Palo Alto, CA (US);
Daniel J. Scales, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 854 days.

(21) Appl. No.: 11/676,109

(22) Filed: Feb. 16, 2007

(51) Int. Cl.
*G06F 12/14* (2006.01)

(52) U.S. Cl.
USPC .......................................... 710/200; 711/152

(58) Field of Classification Search
USPC ......................................................... 711/152
See application file for complete search history.

(56) References Cited

U.S. PATENT DOCUMENTS

| | | | |
|---|---|---|---|
| 4,429,360 A | 1/1984 | Hoffman et al. | |
| 5,151,988 A | 9/1992 | Yamagishi | |
| 5,226,159 A | 7/1993 | Henson et al. | |
| 5,251,318 A | 10/1993 | Nitta et al. | |
| 5,414,840 A | 5/1995 | Rengarajan et al. | |
| 5,502,840 A * | 3/1996 | Barton .......................... | 710/200 |
| 5,692,178 A | 11/1997 | Shaughnessy | |
| 5,848,241 A | 12/1998 | Misinai et al. | |
| 6,078,982 A | 6/2000 | Du et al. | |
| 6,105,085 A | 8/2000 | Farley | |
| 6,105,099 A | 8/2000 | Freitas et al. | |
| 6,128,710 A | 10/2000 | Greenspan et al. | |
| 6,247,023 B1 | 6/2001 | Hsiao et al. | |
| 6,330,560 B1 | 12/2001 | Harrison et al. | |
| 6,389,420 B1 | 5/2002 | Vahalia et al. | |
| 6,466,978 B1 | 10/2002 | Mukherjee et al. | |
| 6,609,128 B1 | 8/2003 | Underwood | |
| 6,622,163 B1 | 9/2003 | Tawill et al. | |
| 6,658,417 B1 | 12/2003 | Stakutis | |
| 6,842,896 B1 * | 1/2005 | Redding et al. ................ | 717/172 |
| 7,089,561 B2 | 8/2006 | Morrison et al. | |
| 7,107,267 B2 | 9/2006 | Taylor | |
| 7,117,481 B1 | 10/2006 | Agesen et al. | |
| 7,124,131 B2 | 10/2006 | Guthridge | |
| 7,240,057 B2 | 7/2007 | Kingsbury et al. | |
| 7,284,151 B2 | 10/2007 | Chandrasekaran | |
| 7,289,992 B2 | 10/2007 | Walker | |
| 7,293,011 B1 | 11/2007 | Bedi et al. | |
| 7,490,089 B1 | 2/2009 | Georgiev | |
| 7,516,285 B1 | 4/2009 | Haynes et al. | |

(Continued)

OTHER PUBLICATIONS

U.S. Appl. No. 11/431,277.

(Continued)

*Primary Examiner* — Gary Portka

(57) ABSTRACT

A method, system and program code for implementing distributed locks to be maintained through the use of on disk heartbeats. An instance of a node need only maintain a single heartbeat for all locks associated with the node and all of its processes. The node updates its heartbeat by accessing common storage, either virtual or physical, and updating a timestamp value in its heartbeat within a predetermined time interval, otherwise the heartbeat becomes stale. Expired heartbeats can be cleared or broken to allow redistribution of any locks associated therewith. The inventive technique may be implemented in a traditional computer environment or in a fully or partially virtualized environment and requires no use of an IP network or a separate network based lock manager.

27 Claims, 9 Drawing Sheets

(56) References Cited

U.S. PATENT DOCUMENTS

| | | | |
|---|---|---|---|
| 7,552,122 | B1 | 6/2009 | Georgiev |
| 7,711,539 | B1 | 5/2010 | Kimmel et al. |
| 7,849,098 | B1 | 12/2010 | Scales et al. |
| 8,321,643 | B1 | 11/2012 | Vaghani et al. |
| 2002/0016771 | A1 | 2/2002 | Carothers et al. |
| 2002/0143704 | A1 | 10/2002 | Nassiri |
| 2002/0174139 | A1 | 11/2002 | Midgley et al. |
| 2003/0041227 | A1 | 2/2003 | Nakamatsu |
| 2003/0065672 | A1 | 4/2003 | Kingsbury et al. |
| 2003/0225760 | A1 | 12/2003 | Ruuth et al. |
| 2004/0117580 | A1 | 6/2004 | Wu et al. |
| 2004/0268062 | A1* | 12/2004 | Ofer .............................. 711/152 |
| 2005/0149683 | A1 | 7/2005 | Chong, Jr. et al. |
| 2006/0047713 | A1 | 3/2006 | Gornshtein et al. |
| 2006/0069665 | A1 | 3/2006 | Yamakawa et al. |
| 2007/0083687 | A1* | 4/2007 | Rinaldi et al. ................. 710/200 |
| 2007/0214161 | A1* | 9/2007 | Goyal et al. ................... 707/101 |
| 2009/0106248 | A1 | 4/2009 | Vaghani et al. |
| 2010/0017409 | A1 | 1/2010 | Rawat et al. |
| 2011/0179082 | A1 | 7/2011 | Vaghani et al. |

OTHER PUBLICATIONS

U.S. Appl. No. 10/773,613.

U.S. Appl. No. 11/707,724 Feb. 16, 2007 titled "Distributed Transaction System".

Venners, "Inside the Java Virtual Machine" unknown but at least 1998; Computing McGraw-Hill 2nd Edition, Chapter 5, 3 pages.

Windows 2000 Support, "How to specify and IP address"; Last revised Oct. 31, 2006; Microsoft, http://support.microsoft.com/kb/308199, 3 pages.

Helmig, "Windows 2000/XP TCP/IP protocol", Feb. 18, 2001, WindowsNetworking.com, http://windowsnetworking.com/articles_tutorials/w2ktcpip.html, 14 pages.

Non-Final Rejection mailed on Nov. 17, 2009 for U.S. Appl. No. 11/676,109, filed Feb. 16, 2007.

Final Rejection mailed on Jan. 29, 2010 for U.S. Appl. No. 10/773,613, filed Feb. 6, 2004.

Final Rejection mailed on Sep. 29, 2008 for U.S. Appl. No. 10/773,613, filed Feb. 6, 2004.

Non-Final Rejection mailed on May 27, 2009 for U.S. Appl. No. 10/773,613, filed Feb. 6, 2004.

Non-Final Rejection mailed on Jan. 9, 2008 for U.S. Appl. No. 10/773,613, filed Feb. 6, 2004.

Non-Final Rejection mailed on Feb. 17, 2011 for U.S. Appl. No. 12/939,532, filed Nov. 4, 2010.

Final Rejection mailed on Sep. 13, 2011 for U.S. Appl. No. 12/939,532, filed Nov. 4, 2010.

Final Rejection mailed on Nov. 10, 2011 for U.S. Appl. No. 12/324,665, filed Nov. 26, 2008.

Non-Final Rejection mailed on Nov. 10, 2011 for U.S. Appl. No. 11/676,109, filed Feb. 16, 2007.

Final Rejection mailed on Aug. 6, 2010 for U.S. Appl. No. 11/676,109, filed Feb. 16, 2007.

Final Rejection mailed on Jun. 9, 2011 for U.S. Appl. No. 11/707,724, filed Feb. 16, 2007.

Final Rejection mailed on Jun. 6, 2012 for U.S. Appl. No. 11/707,724, filed Feb. 16, 2007.

Non-Final Rejection mailed on Oct. 1, 2010 for U.S. Appl. No. 11/707,724, filed Feb. 16, 2007.

Final Rejection mailed on Dec. 2, 2009 for U.S. Appl. No. 11/707,724, filed Feb. 16, 2007.

Non-Final Rejection mailed on Jun. 24, 2009 for U.S. Appl. No. 11/707,724, filed Feb. 16, 2007.

Non-Final Rejection mailed on Nov. 16, 2011 for U.S. Appl. No. 11/707,724, filed Feb. 16, 2007.

Non-Final Rejection mailed on Jul. 20, 2011 for U.S. Appl. No. 12/324,665, filed Nov. 26, 2008.

* cited by examiner

ASSOCIATING HEARTBEAT DATA WITH ACCESS TO SHARED RESOURCES OF A COMPUTER SYSTEM

FIELD OF THE INVENTION

This invention relates generally to computer architecture, and, in particular, to a method and system for implementing distributed locks in an environment containing shared storage.

BACKGROUND OF THE INVENTION

As computer systems scale to enterprise levels, particularly in the context of supporting large-scale data centers, the underlying data storage systems frequently adopt the use of storage area networks (SANs). As is conventionally well appreciated, SANs provide a number of technical capabilities and operational benefits, fundamentally including virtualization of data storage devices, redundancy of physical devices with transparent fault-tolerant fail-over and fail-safe controls, geographically distributed and replicated storage, and centralized oversight and storage configuration management decoupled from client-centric computer systems management.

Architecturally, a SAN storage subsystem is characteristically implemented as a large array of Small Computer System Interface (SCSI) protocol-based storage devices. One or more physical SCSI controllers operate as the externally accessible targets for data storage commands and data transfer operations. The target controllers internally support bus connections to the data storage devices, identified as logical units (LUNs). The storage array is collectively managed internally by a storage system manager to virtualize the physical data storage devices. That is, the SCSI storage devices are internally routed and respond to the virtual storage system manager as functionally the sole host initiator accessing the SCSI device array. The virtual storage system manager is thus able to aggregate the physical devices present in the storage array into one or more logical storage containers. Virtualized segments of these containers can then be allocated by the virtual storage system as externally visible and accessible LUNs with uniquely identifiable target identifiers. A SAN storage subsystem thus presents the appearance of simply constituting a set of SCSI targets hosting respective sets of LUNs. While specific storage system manager implementation details differ as between different SAN storage device manufacturers, the desired consistent result is that the externally visible SAN targets and LUNs fully implement the expected SCSI semantics necessary to respond to and complete initiated transactions against the managed container.

A SAN storage subsystem is typically accessed by a server computer system implementing a physical host bus adapter (HBA) that connects to the SAN through network connections. Within the server, above the host bus adapter, storage access abstractions are characteristically implemented through a series of software layers, beginning with a low-level SCSI driver layer and ending in an operating system specific filesystem layer. The driver layer, which enables basic access to the target ports and LUNs, is typically vendor specific to the implementation of the SAN storage subsystem. A data access layer may be implemented above the device driver to support multipath consolidation of the LUNs visible through the host bus adapter and other data assess control and management functions. A logical volume manager (LVM), typically implemented intermediate between the driver and conventional operating system filesystem layers, supports volume oriented virtualization and management of the LUNs accessible through the host bus adapter. Multiple LUNs can be gathered and managed together as a volume under the control of the logical volume manager for presentation to and use by the filesystem layer as an integral LUN.

In typical implementation, SAN systems connect with upper-tiers of client and server computer systems through a communications matrix frequently implemented using a Fibre Channel (FC) based communications network. Logically, a Fibre Channel network is a bidirectional, full-duplex, point-to-point, serial data channel structured specifically for high performance data communication. Physically, the Fibre Channel is an interconnection of multiple communication ports, called N_Ports, implemented by the host bus adapters and target controllers. These communication ports are interconnected by a switching network deployed as a n-way fabric, a set of point-to-point links, or as an arbitrated loop.

Strictly defined, Fibre Channel is a generalized transport mechanism that has no high-level data flow protocol of its own or native input/output command set. While a wide variety of existing Upper Level Protocols (ULPs) can be implemented on Fibre Channel, the most frequently implemented is the SCSI protocol. The SCSI Fibre Channel Protocol (FCP) standard defines a Fibre Channel mapping layer that enables transmission of SCSI command, data, and status information between a source host bus adapter, acting as a SCSI initiator, and a destination SCSI target controller, over any Fibre Channel connection path as specified by a Fibre Channel path identifier. As defined relative to a target, a FC path identifier is a reference to the destination port and logical unit of the SAN storage system. The port is uniquely specified by a World Wide Port Name (WWPN). The LUN identifier is a unique, hardware independent SCSI protocol compliant identifier value retrievable in response to a standard SCSI Inquiry command.

A common alternative transport mechanism to Fibre Channel is defined by the Internet Small Computer System Interface (iSCSI) standard. Instead of relying on a new FC media infrastructure, the iSCSI standard is designed to leverage existing TCP/IP networks including specifically the existing mixed-media infrastructure, including typical intranet and internet networks, and to use internet protocol (IP) layer for upper-level command and data transport. Unlike Fibre Channel, the SCSI protocol is the exclusive upper-level protocol supported by iSCSI. That is, the iSCSI protocol semantics (IETF Internet Draft draft-ietf-ips-iSCSI-08.txt; www.ietf.org) specifically requires the transmission of SCSI command, data, and status information between SCSI initiators and SCSI targets over an IP network. Similar to the FC path, an iSCSI path, as specified by a SCSI initiator, is a combination of a target IP address and LUN identifier.

As generally illustrated in FIGS. 1A and 1B, a typical system architecture 60 implements a logical volume manager 62 on a computer system 12, that is, at a system tier above the data storage systems 16, as a software layer beneath a local filesystem layer 64. By execution of the logical volume manager 62, the filesystem layer 64 is presented with a data storage view represented by one or more discrete data storage volumes 66, each of which is capable of containing a complete filesystem data structure. The specific form and format of the filesystem data structure is determined by the particular filesystem layer 64 employed. For the preferred embodiments of the present invention, physical filesystems, including the New Technology filesystem (NTFS), the Unix filesystem (UFS), the VMware Virtual Machine filesystem (VMFS), and the Linux third extended filesystem (ext3FS), may be used as the filesystem layer 64.

As is conventional for logical volume managers, each of the data storage volumes 66 is functionally constructed by the logical volume manager 62 from an administratively defined set of one or more data storage units representing LUNs. Where the LUN storage, at least relative to the logical volume manager 62, is provided by network storage systems 16, the data storage volumes 66 are assembled from an identified set of the data storage units externally presented by the network storage systems 16. That is, the logical volume manager 62 is responsible for functionally managing and distributing data transfer operations to the various data storage units of particular target data storage volumes 66. The operation of the logical volume manager 62, like the operation of a storage system manager 24, is transparent to applications 68 executed directly by computer systems 12 or by clients of computer systems 12.

A preferred system architecture 60, implementing a virtual machine based system 70, is shown in FIG. 1C. An integral computer system 72, generally corresponding to one of the computer systems 12, is constructed on a conventional, typically server-class hardware platform 74, including in particular host bus adapters 76 in addition to conventional platform processor, memory, and other standard peripheral components (not separately shown). The server platform 74 is used to execute a virtual machine (VMKernel) operating system 78 supporting a virtual machine execution space 80 within which virtual machines (VMs) $82_{1-N}$ are executed. For the preferred embodiments of the present invention, the virtual machine kernel 78 and virtual machines $82_{1-N}$ are implemented using the ESX Server virtualization product manufactured and distributed by VMware, Inc., Palo Alto, Calif. Use of the ESX Server product and, further, implementation using a virtualized computer system 12 architecture, is not required in the practice of the present invention.

In summary, the virtual machine operating system 78 provides the necessary services and support to enable concurrent execution of the virtual machines $82_{1-N}$. In turn, each virtual machine $82_{1-N}$ implements a virtual hardware platform 84 that supports the execution of a guest operating system 86 and one or more typically client application programs 88. For the preferred embodiments of the present invention, the guest operating systems 86 are instances of Microsoft Windows, Linux and Netware-based operating systems. Other guest operating systems can be equivalently used. In each instance, the guest operating system 86 includes a native filesystem layer, typically either an NTFS or ext3FS type filesystem layer. These filesystem layers interface with the virtual hardware platforms 84 to access, from the perspective of the guest operating systems 86, a data storage host bus adapter. In the preferred implementation, the virtual hardware platforms 84 implement virtual host bus adapters 90 that provide the appearance of the necessary system hardware support to enable execution of the guest operating system 86 transparent to the virtualization of the system hardware.

Filesystem calls initiated by the guest operating systems 86 to implement filesystem-related data transfer and control operations are processed and passed through the virtual host bus adapter 90 to adjunct virtual machine monitor (VMM) layers $92_{1-N}$ that implement the virtual system support necessary to coordinate operation with the virtual machine kernel 78. In particular, a host bus emulator 94 functionally enables the data transfer and control operations to be ultimately passed to the host bus adapters 76. The system calls implementing the data transfer and control operations are passed to a virtual machine filesystem (VMFS) 96 for coordinated implementation with respect to the ongoing operation of all of the virtual machines $82_{1-N}$. That is, the native filesystems of the guest operating systems 86 perform command and data transfer operations against virtual SCSI devices presenting LUNs visible to the guest operating systems 86. These virtual SCSI devices are based on emulated LUNs actually maintained as files resident within the storage space managed by the virtual machine filesystem 96. In this respect, the virtual machine filesystem 96 is to the virtual machines $82_{1-N}$ what the storage system 16 is to the physical computer systems 12. Permitted guest operating system 86 command and data transfer operations against the emulated LUNs are mapped between the LUNs visible to the guest operating systems 86 and the data storage volumes visible to the virtual machine filesystem 96. A further mapping is, in turn, performed by a virtual machine kernel-based logical volume manager 62 to the LUNs visible to the logical volume manager 62 through the data access layers 98, including device drivers, and host bus adapters 76. The system illustrated in FIGS. 1A-C is disclosed in greater detail in commonly owned U.S. patent application Ser. No. 11/431,277, entitled "System and Methods for Automatically Re-Signaturing Multi-Unit Data Storage Volumes in Distributed Data Storage Systems", filed 9 May 2006, the subject matter of which is incorporated herein by reference for all purposes.

Distributed locks are locks that can be used to synchronize the operations of multiple nodes within a computer system. Such nodes may be present within the same computer or distributed among different computers interconnected by a network. A lock is a mechanism utilized by a node to gain access to a system resource and to handle competing requests among multiple nodes in an orderly and efficient manner. Prior art distributed locks are most commonly implemented using a network lock manager, wherein each lock is associated with a node that is the current manager of the lock. When a particular node N wants to acquire a lock, that node must talk to the current manager node M of the lock via an IP network. The manager node M can then grant the lock to node N or indicate that the lock is currently held by another node. Issues arise with a network lock manager when the IP network used for such communications is not working. One solution, is to elect a new manager for the lock, however, this creates many complicated implementation issues. In some systems, the most reliable network available is the storage area network (SAN), rather than the IP network. As a result, a more reliable way to implement distributed locks is to maintain the lock data structure on disk and use the SAN to access them. In order to deal with possible crashes of nodes, the distributed locks can be lease-based. That is, a node that holds a lock must renew a "lease" on the lock before the lease expires, typically by incrementing or otherwise changing a "pulse field" in the on-disk lock data structure associated with the lock, to indicate that the node still holds the lock and has not crashed. Another node can break the lock if the lease has not been renewed by the current holder for the duration of the lease. A prior application which addresses this problem is disclosed in commonly owned U.S. patent application Ser. No. 10/773,613 entitled "Providing Multiple Concurrent Access to a File System", filed Feb. 6, 2004, the subject matter of which is incorporated herein by reference for all purposes. One problem with the lease-based scheme is that if a node holds many locks, a node must expend considerable resources simply to renew the leases on the locks it is currently holding. Shared resources like disk and network bandwidth are expended as well.

Some clustering software, such as RedHat Cluster Suite, commercially available from Red Hat, Raleigh, N.C., and Veritas Cluster Service, commercially available from Symantec Corporation, Cupertino, Calif., transmit a heartbeat to a "quorum" disk as an extra way to help determine if a node is down. However, these systems do not specifically implement locks, and their primary method of detecting if a node is alive is via an IP network, which suffers from the same network failure vulnerability described previously.

A prior attempt at utilizing on-disk heartbeats can be found in the Oracle Cluster File System, OCFS2, a clustered (distributed) file system developed by Oracle Corporation and released under the GNU General Public License which utilizes an on-disk heartbeat to determine which members of the cluster are actually alive. However, such system has a separate lock manager which is network-based that implements distributed locks, and, accordingly, suffers from the same network failure vulnerability described previously.

Accordingly, need exists for an approach to implementing lease-based distributed locks which does not require a separate, network based lock manager.

A further need exists for an approach to implementing lease-based distributed locks which is scalable and does not require multiple renewal processes or additional resources per renewal of each lock.

Yet a further need exists for a technique for implementing lease-based distributed locks which can accommodate a node's connection to its disk being interrupted for variable periods of time.

SUMMARY OF THE INVENTION

The present invention discloses a technique or protocol that enables lease-based distributed locks to be maintained more efficiently and reliably through the use of on-disk heartbeats. In the disclosed technique, an instance of a node need only maintain a single heartbeat for all locks associated therewith. The node updates its heartbeat by accessing common storage, either virtual or physical, and updating a pulse timestamp value in its heartbeat within a predetermined time interval, otherwise the heartbeat becomes stale. Techniques are further provided for clearing stale heartbeats and to allow a node to define the timeout interval for its respective heartbeat. The inventive technique may be implemented in a traditional computer environment or in a fully or partially virtualized environment and requires no use of an IP network or a separate network based lock manager.

In the illustrative embodiment, a system may be any group of shared resources, such as a file system. A resource may be an entity to which shared access must be controlled, typically a file, a record, or an area of shared memory, but can be anything that the application designer chooses. Within the system, a node may be any entity that is capable of ownership of resources. Nodes may also have the characteristics of being named by persistent identification and the ability to hold lease-based locks on shared resources. In a contemplated embodiment, a node obtains control over one or more resources with a lock. The locks obtained by a particular node are associated with a single heartbeat. The heartbeat is implemented as a data structure on disk that contains various information for identifying the particular node instance. The locks are also implemented as data structures on disk that contain various information for identifying the node owning the lock and an address of the node's corresponding heartbeat. It is possible for other nodes to determine the owner of a lock from the lock data structure, and whether it's corresponding heartbeat is being renewed, and therefore the lock is still in use. Techniques are further provided for clearing stale heartbeats and for allowing a node to define the timeout for its respective heartbeat.

According to one aspect of the invention, in a computer system having a plurality of shared resources, a method or computer program product comprises: (A) identifying a lock associated with one of the shared resources, the lock associated with a heartbeat which identifies one of the plurality of nodes as an owner having access to the shared resource; (B) determining if the owner is renewing the heartbeat; and (C) modifying the lock to disassociate the owner from the shared resource if the owner is not renewing the heartbeat.

According to a second aspect of the invention, in a computer system having a plurality of shared resources, a method comprises: (A) maintaining a first lock data structure associated with a first shared resource and a heartbeat data structure, (B) maintaining a second lock data structure associated with a second shared resource and the heartbeat data structure, (C) modifying one of the first and second lock data structures if no modifications to the heartbeat data structure occur within a predetermined threshold.

According to a third aspect of the invention, in a computer system having a plurality of shared resources, a method comprises: (A) maintaining in storage at least one heartbeat data structure, the heartbeat data structure comprising: (i) owner data identifying a current owner of the heartbeat; (ii) state data identifying a current state of the heartbeat; and (iii) pulse data identifying a time of last renewal of the heart beat; and (B) allowing the heartbeat to be modified if the pulse data is not changed within a predetermined threshold.

According to a fourth aspect of the invention, in a computer system having a plurality of shared resources, a method or computer program product comprises: (A) identifying a heartbeat data structure associated with one of the shared resources, the heartbeat data structure identifying an owner having access to the shared resource; (B) monitoring the heartbeat data structure for periodic modifications thereto by the identified owner; and (C) modifying a state value associated with the heartbeat data structure if no modifications to the heartbeat data structure by the owner occur within a predetermined threshold.

According to a fifth aspect of the invention, in a computer system having a plurality of shared resources, a method comprises: (A) maintaining in memory at least one heartbeat data structure, the heartbeat data structure comprising: (i) owner data identifying a current owner of the heartbeat; (ii) state data identifying a current state of the heartbeat; and (iii) pulse data identifying a value of last renewal of the heartbeat; and (B) modifying the pulse data within a predetermined threshold.

According to a sixth aspect of the invention, in a computer system comprising a first physical computer, a second physical computer, a data storage unit, a first data link for connecting the first physical computer to the data storage unit and a second data link for connecting the second physical computer to the data storage unit, the computer system further comprises: a first virtual machine running on the first physical computer; a second virtual machine running on the second physical computer; and a file system stored on the data storage unit, the file system comprising: a first data entity, the first data entity being usable by the first virtual machine and by the second virtual machine; a lock for providing exclusive access to the first data entity, the lock comprising: an owner field and an address field, the owner field being used to determine if the first data entity has been leased by a computing entity and the address field being used to access a heartbeat; and a heartbeat comprising an owner field and a pulse field, the owner field being used to determine a computing entity having exclusive access to the first data entity, and the pulse field being used to determine if the computing entity is maintaining exclusive access thereto within a predetermined threshold.

BRIEF DESCRIPTION OF THE DRAWINGS

The above and further advantages of the invention may be better understood by referring to the following description in conjunction with the accompanying drawings in which.

DETAILED DESCRIPTION

Figure 1A:
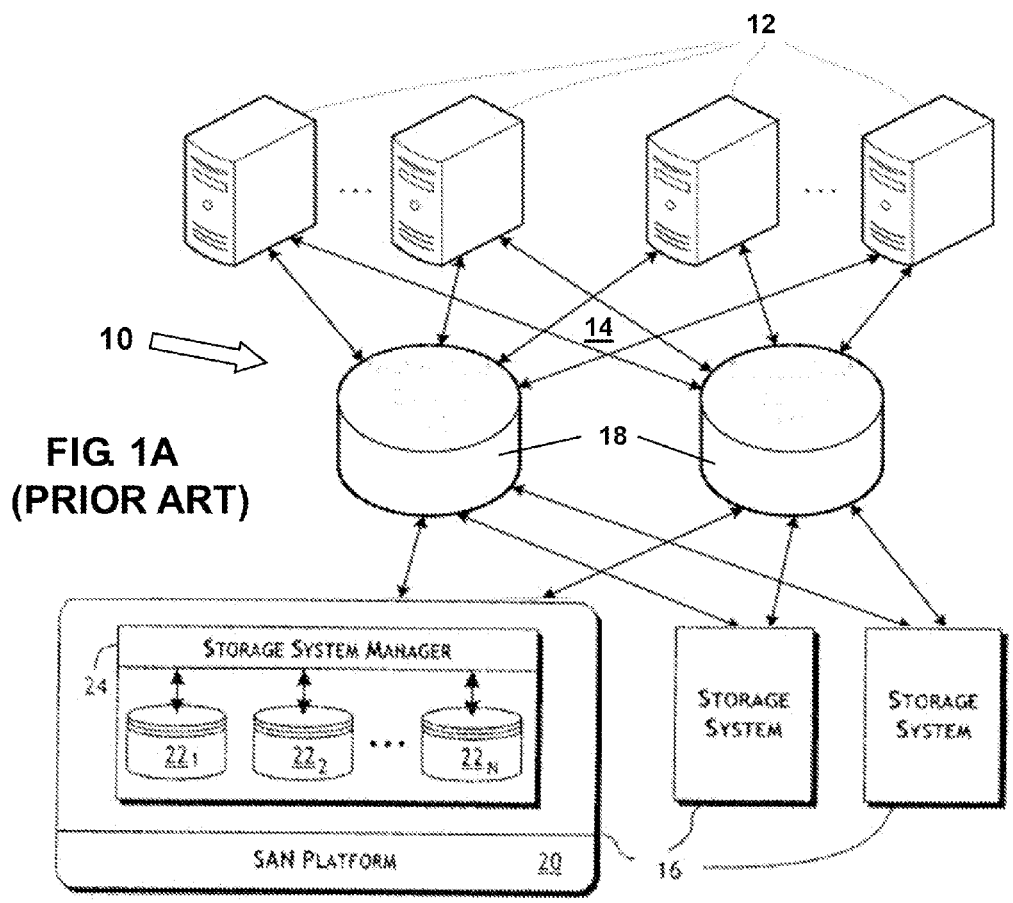
FIGS. 1A-C are conceptual diagrams of computer systems suitable for use with the present invention.

The present invention is generally applicable in computing environments where data storage volumes used by client computer systems are managed within a distributed storage system that supports typically automatic data replication operations. Accordingly, a preferred environment for the implementation of the present invention is in otherwise conventional storage area network (SAN) based data centers. From the following detailed description of the invention, however, those of ordinary skill in the art will readily understand that the present invention is not constrained to use in a particular environment, system or network architecture or by use of a particular operating system or set of data communications protocols. The following description of the present invention is presented in the context of a data center application as illustrative of a preferred embodiment for clarity of presentation and explanation. Also for clarity of description, as used in the following detailed description of the invention, like reference numerals are used to designate like parts depicted in one or more of the figures.

Figure 1B:
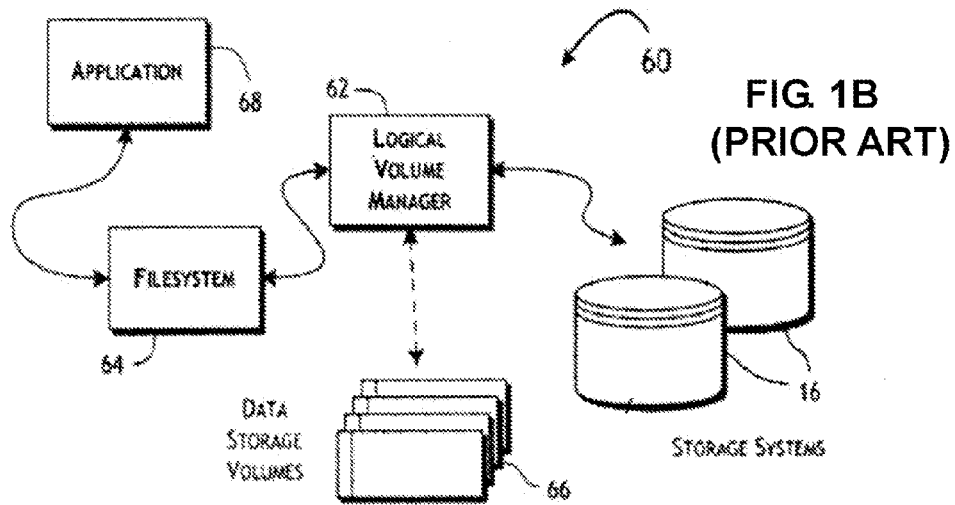

As generally shown in FIG. 1, a preferred data center 10 hosted implementation of the present invention typically supports one or more tiers of computer systems 12 that, directly as clients or as servers operating indirectly on behalf of one or more upper tiers of client and server computer systems, provides access to logical units of storage hosted by a SAN 14 and underlying data storage systems 16. The SAN 14 can be implemented using any of a variety of technologies, though typically using Fibre Channel or iSCSI technology. These technologies allow construction of a redundant, failover and multipath capable interconnection network, using for example redundant routers 18 and network connections, that in turn ensures overall reliability. In a typical implementation, additional data management features are implemented through logical volume managers and data access layers executed in a server tier of computer systems 12. Client computer systems are constrained to mounting and accessing data storage volumes through the server tier and thereby effectively inherit the logical unit management functions implemented by the logical volume managers of the server tier. Logical volume managers, however, can be and frequently are implemented at multiple levels including in client computer systems.

The different potential locations of logical storage managers are generally not significant to the operation of the SAN 14 and, in particular, the underlying data storage systems 16. While the SAN 14 provides routeable multipath access, the data storage systems 16 presents a relatively large collection of externally visible LUNs, also referred to in the context of the present invention as data storage units (DSUs), accessible by the computer systems 12, subject to conventional access controls. Individually, the data storage systems 16 are relatively conventional computer platforms 20, though specialized to support typically high-bandwidth fibre channel network interfaces and to host large parallel arrays of typically SCSI-based disk drive storage units 22$_1$-N. Aggregate network bandwidth at the SAN 14 interface typically in excess of 200 Megabytes per second and online storage capacity in excess of 10 terabytes on a single system 16 is presently not uncommon. Collectively, the data storage systems 16 are often geographically distributed to reduce access latency, distribute load, and ensure that power and network disruptions do not compromise the entire function of the system 10.

Conventionally, a storage system manager 24 is executed on the storage system platform 20 to implement a virtualization of the physical, typically disk drive-based storage units 22$_1$-N present in the local storage system 16. The storage system manager 24 performs the real to virtual translations necessary to support the presentation of data storage units to the computer systems 12 for use as, in effect, standard SCSI-based LUNs. This virtualization of the internal LUN storage allows a more efficient utilization of the physical storage units 22$_1$-N through logical aggregation into a contiguous container storage space. The container may be dynamically reconfigured and expanded depending on demand patterns without materially affecting the ongoing use of a particular data storage system 16 by the computer systems 12; the presentation of the data storage units can be preserved even while maintenance is performed on an array of physical storage units 22$_1$-N.

Figure 1C:
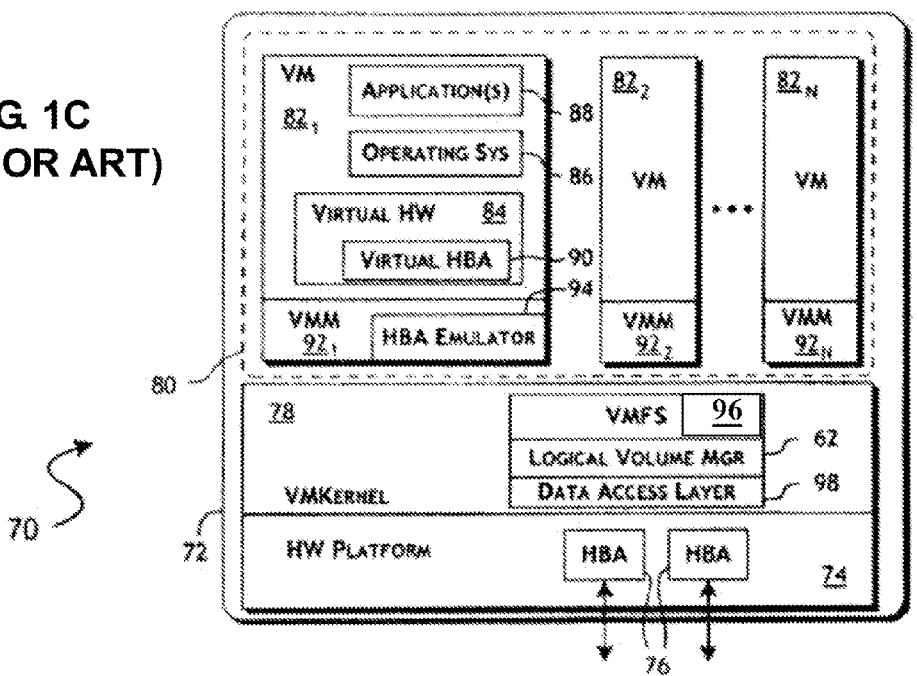

In the illustrative embodiment, a "system" may be any group of shared resources, such as a file system. A resource may be an entity to which shared access must be controlled, typically a file, a record, or an area of shared memory, but can be anything that the application designer chooses. A node may be any entity that is capable of resource ownership. In addition, a node may have the optional characteristics of being identified by a persistent identifier within a system and the ability to hold lease-based locks on shared resources. Each time a node is rebooted or reinitialized, a different instance of that node is created. In the computer system illustrated in FIG. 1A, any of computers 12 may be a node. In an implementation of the present invention in a virtual machine environment, any of virtual machines 82, as illustrated in FIG. 1C may be considered a node. In a contemplated embodiment, a node obtains control over a resource with a lock. The locks obtained by a particular node instance are associated with a single heartbeat. The heartbeat is implemented as a data structure on disk that contains various information for identifying the particular node instance. The locks are also implemented as data structures on disk that contain various information for identifying the node instance owning the lock and an address of the its corresponding heartbeat.

Figure 2:
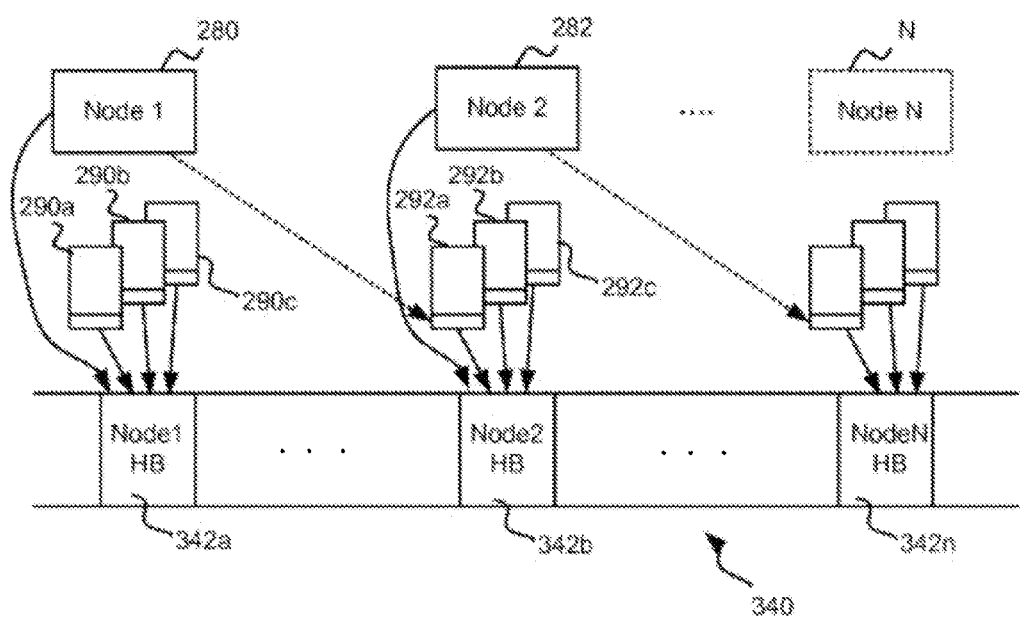
FIG. 2 illustrates conceptually the logical organization and relationship among a plurality of nodes, node instances, locks, and heartbeats in accordance with the present invention.

Referring to FIG. 2, the logical organization and relationship among a plurality of nodes, locks, resources and heartbeats in accordance with the present invention is illustrated conceptually. In the present invention, a node is any entity that shares the same resources with other nodes. As illustrated, node 280 may have associated therewith one or more locks 290$a$, 290$b$, 290$c$, . . . 290$n$, each associated with a resource. Each of locks 290$a$, 290$b$, 290$c$, . . . 290$n$ have associated therewith a pointer data which identifies a heartbeat region 342$a$ uniquely associated with an instance of node 280. Similarly, each of locks 292*a*, 292*b*, 292*c*, ... 290*n* held by node 282 have associated therewith a pointer data which identifies a heartbeat region 342*b* uniquely associated with an instance of node 282. By requiring all nodes to refresh their respective heartbeat region within either a system wide or node-specific time constant, a protocol which enables other nodes to determine whether a heartbeat and its respective locks are viable or stale is possible. For example, in FIG. 2 the solid curved lines from each of nodes 280 and 282 to their respective heartbeats indicates a refresh of the heartbeat data structure. Node N, illustrated in phantom, is an expired instance of a node. Node N is no longer refreshing its heartbeat, however, the locks associated with the node still point to its respective heartbeat 342*n*. If node 280 wishes to acquire a lock currently held by node 282, as illustrated by the dotted line emanating from node 280, then node 280 can determine from monitoring the heartbeat data structure if heartbeat 342*b* is still viable, which in this case is still "beating". Therefore node 280 will have to wait to acquire the lock or fail the operation because the lock could not be acquired. Conversely, if a process from node 282 wishes to acquire a resource currently locked by node N, as illustrated by the dotted line emanating from node 282, then node 282 can determine from monitoring the heartbeat data structure if heartbeat 342*n* is still viable, which in this case is "stale", and, therefore, node 282 may clear heartbeat 342*n* by modifying the state value thereof, and thereafter, node 282 is free to acquire one or more of the locks associated with heartbeat 342*n*.

In the illustrative embodiment, the disk is used to store a heartbeat segment 340. Heartbeat allocation is achieved by allocating a segment 340 of the disk that is big enough to hold a plurality of heartbeat regions 342, for example 10 Mbytes. Within this heartbeat segment 340, each of the heartbeat regions 342*a*, 342*b*, ... 342*n* of a system may generally be at least as large as the minimum sector size on the disk. For example, on SCSI disks, each heartbeat region may be 512 bytes. Alternatively, the respective heartbeat regions 342*a*, 342*b*, ... 342*n* as well as the overall heartbeat segment may have sizes chosen at the discretion of the designer to optimize memory usage as well as to accommodate the anticipated number of heartbeats associated with nodes within the system. In the present invention, the number of heartbeat regions 342 within heartbeat segment 340 is typically much greater than the maximum number of live nodes within the system. Unless otherwise noted herein, the term "heartbeat" is used interchangeably to refer to both the data structure 345 and the heartbeat region 342 on which the data structure resides.

The dynamic heartbeat allocation algorithm disclosed herein avoids any requirement to configure nodes ahead of time as part of a cluster. Once a node has allocated a heartbeat region, it can store configuration information about itself, e.g. its IP address or host name, in the "other node-specific information" area 354 of heartbeat region 345, as well.

Heartbeat Structure and Definition

Figure 3:
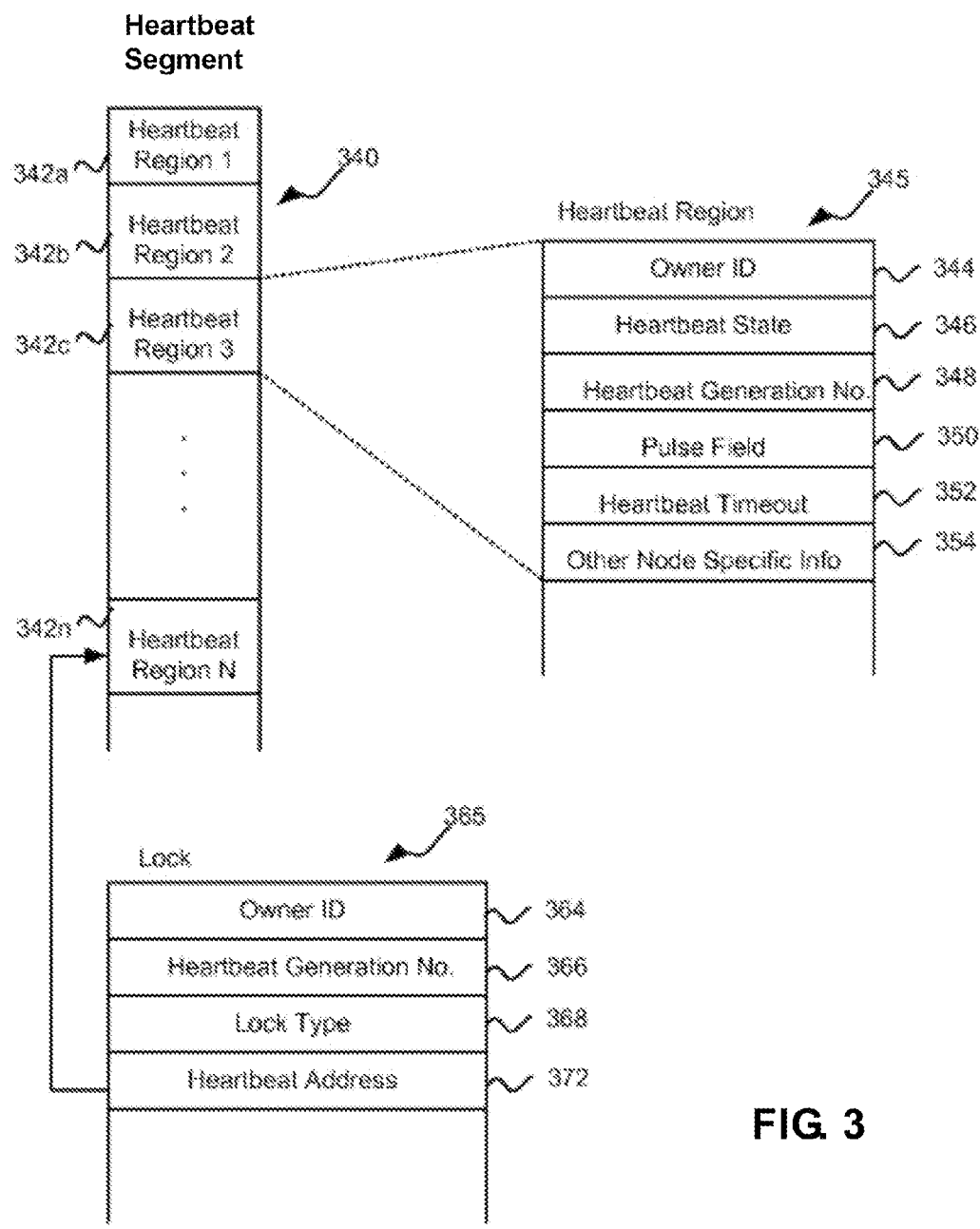
FIG. 3 illustrates conceptually the logical organization and relationship among a lock, a heartbeat region and the heartbeat segment in accordance with the present invention.

In FIG. 3, the heartbeat data structure 345 that occupies heartbeat regions 342*a*, 342*b*, ... 342*n* comprises the following fields:

Owner Identifier
Heartbeat State
Heartbeat Generation Number
Pulse Field
Other Node-Specific Information
Heartbeat Time Out The Owner Identifier field 344, also referred to as the owner ID, uniquely identifies the node owning the heartbeat region and may be implemented with any data type, including, but not limited to, alphanumeric or binary, with a length chosen that allows for sufficient unique identifiers within the system. Any number of different identification schemes may be utilized provided that all nodes within a system may identify the node that currently owns a particular heartbeat region 342. In an alternative embodiment, the owner ID field can be omitted as it is possible to uniquely identify a node instance using only the address of the heartbeat region and the heartbeat generation number. It should be noted, however, that the owner ID field enables various optimizations and eases debugging.

The heartbeat state field 346 indicates the current state of the heartbeat and may be implemented with any enumeration data type that is capable of assuming multiple states. In the illustrative embodiment, the heartbeat state value may assume any of the following states:

CLEAR—heartbeat is not currently being used;
IN_USE—heartbeat structure is being used by a node;
BREAKING—heartbeat has timed out and is being cleared by another node.

The heartbeat generation number 348 is a modifiable value that indicates the number of times the heartbeat region has been initialized and may be implemented with a 64-bit integer data type. The heartbeat generation number 348 may be modified, typically incremented each time the heartbeat region is allocated to a node. Together with the address of the heartbeat region, heartbeat generation number 348 may be used to uniquely identify a particular instance of a heartbeat. For example, the heartbeat generation number 348 may be used to determine if a node has de-allocated a heartbeat region and then re-allocated the same region. Accordingly, the heartbeat generation number enables other nodes to determine if a heartbeat is owned by the same instance of a node as recorded in the lock data structure.

The pulse field 350 is a value that changes each time the heartbeat is renewed (heartbeating) by its respective owner and may be implemented with a 64-bit integer data type. In one embodiment, pulse field 350 may be implemented with a timestamp. Alternatively, pulse field 350 may be implemented with another value that is not in a time format but is guaranteed to change each time the heartbeat is renewed. Other nodes can tell if the owner node is heartbeating by observing changes in the pulse field 350. The value of the pulse field 350 may be updated using a number of techniques. For example, the pulse field 350 may be incremented relative to an initial starting value derived internally from within the system. Alternatively, pulse field 350 may be set to the value of the local time, at the instant of renewal, etc. In the illustrative embodiment, there is no requirement for clocks to be synchronized across hosts for the lock-leasing technique disclosed herein to work.

The other node-specific information area 354 is undefined additional storage that does not require a specific data type to be associated therewith. This area of data structure 345 allows additional useful data to be stored along with the heartbeat specific data and may include data that is unique to or associated with the node that currently owns the heartbeat. For example, in the context of a distributed file system, a pointer to a journal file for the subject node, which can be replayed if the node crashes, may be stored within the other node-specific information area 354 of the heartbeat data structure 345.

Lock Structure and Definition

In the illustrative embodiment, the on-disk lock 365 may be implemented with a data structure that contains the ID of the node holding the lock, a pointer to the heartbeat region 342 of the node instance holding the lock, and the generation number of the heartbeat when the lock was acquired. In this manner, another node can verify if the locking node is still heartbeating and has not crashed since acquiring the lock. Locks may typically be stored within the same failure domain, such as the same disk, as the heartbeat segment 340. In the present invention, a lock data structure 365 is associated with each resource within the system and may be maintained on disk.

In FIG. 3, a lock data structure 365 that may be associated with each resource within a system comprises the following fields:

Owner Identifier (Node that owns the Lock)
Heartbeat Address
Heartbeat Generation Number
Lock Type
Other Lock Specific Information The Owner Identifier field 364 may be implemented similar to that of Owner Identifier field 344 of heartbeat data structure 345. In the contemplated system, Owner Identifier field 364 and Owner Identifier field 344 may have the same value for a heartbeat which has not become stale or expired, that is, the node that owns the heartbeat, also owns all locks associated with that heartbeat. This requirement does not exist in the alternative embodiment in which an owner ID has not been specified in the heartbeat, even though the lock is free to contain an owner ID for optimization and debugging reasons.

The heartbeat generation number 366 may be implemented similar to that of heartbeat generation number 348 of heartbeat data structure 345. In the contemplated system, heartbeat generation number 348 and heartbeat generation number 366 may have the same value for a heartbeat which has not become stale.

The lock type field 368 indicates the type of lock associated with the resource and may be implemented with any enumeration data type that is capable of assuming multiple states. In the illustrative embodiment, the lock type field may typically have multiple values that will be defined by the number and types of locks available within the system. As such these values are left to the discretion of the system designer. The system described herein may be implemented with any lock type. Typical types of locks may include any of a Null, Concurrent Read, Concurrent Write, Protected Read, Protected Write, or Exclusive lock type.

The heartbeat address field 372 identifies the location of the lock owner's heartbeat region and may be implemented with a pointer to the specific heartbeat region 342 of heartbeat segment 340 that contains the heartbeat data structure 345 corresponding to the owner of the heartbeat associated with the lock.

Optionally, lock data structure 365 may further comprise an other lock-specific information area (not shown) utilized for other data types to be associated therewith. This area of data structure 365 allows additional useful data to be stored along with the lock data and may include data that is unique to or associated with the node that currently owns the lock. In the present invention, a lock data structure 365 is associated with each resource within the system and may be maintained on a disk of the SAN.

In the illustrative embodiment, each lock data structure 365 resides with its respective resource and is, therefore, mapped or associated with a system resource. When a node attempts to gain access to a resource the node can immediately determine if the resource is locked by reading the lock data structure from disk. Depending on whether the techniques described herein are used with a traditional computer system or one which is completely or partially virtualized, The resource to lock mapping may vary at the discretion of the designer provided that some association is maintained there between. For example, such mappings may be implemented using one or more tables stored on disk or within the same failure domain as the heartbeat segment 340.

Heartbeat Allocation Process

Figure 4A:
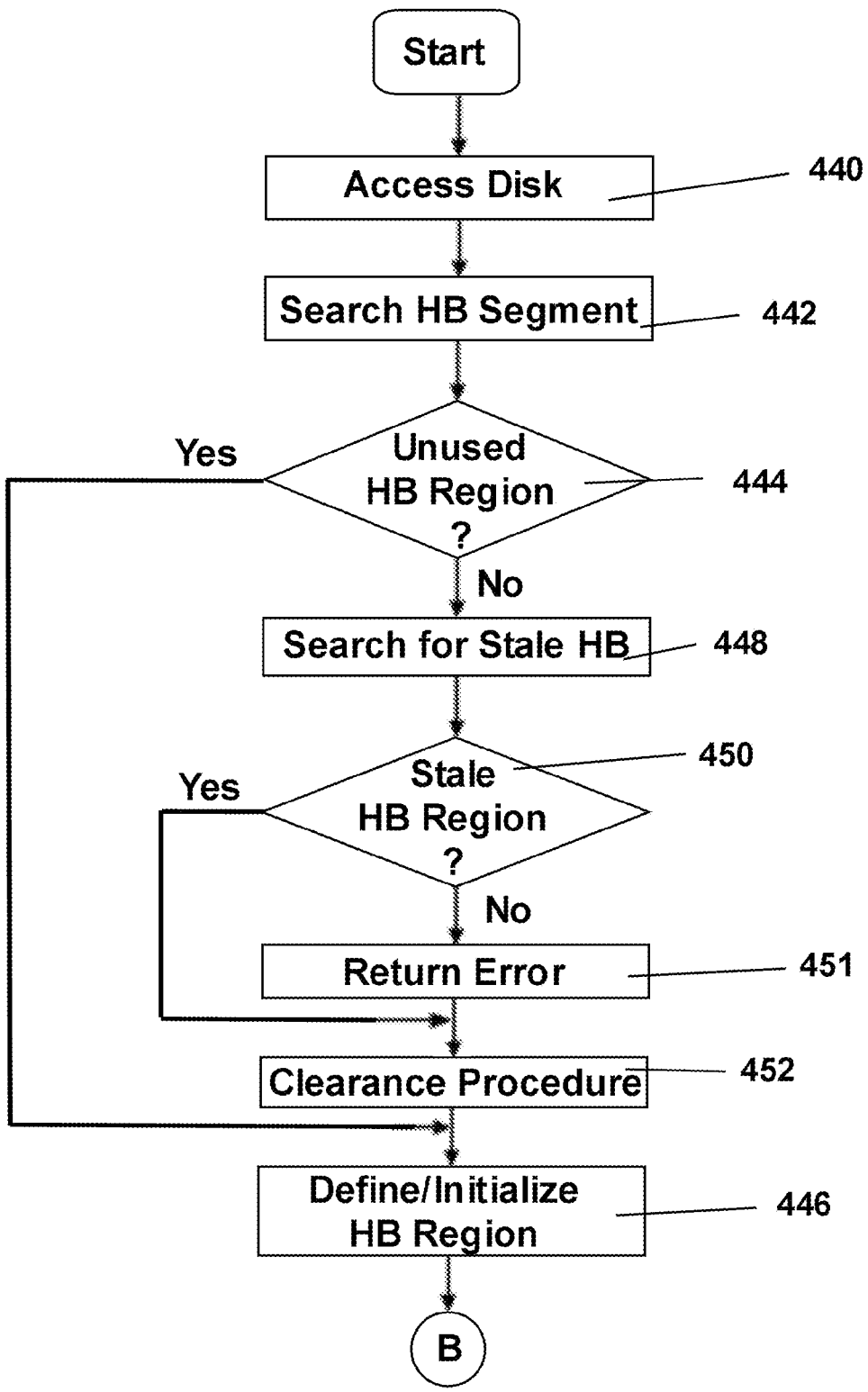
FIGS. 4A-B form a flow diagram of the heartbeat processes in accordance with the present invention.
Figure 4B:
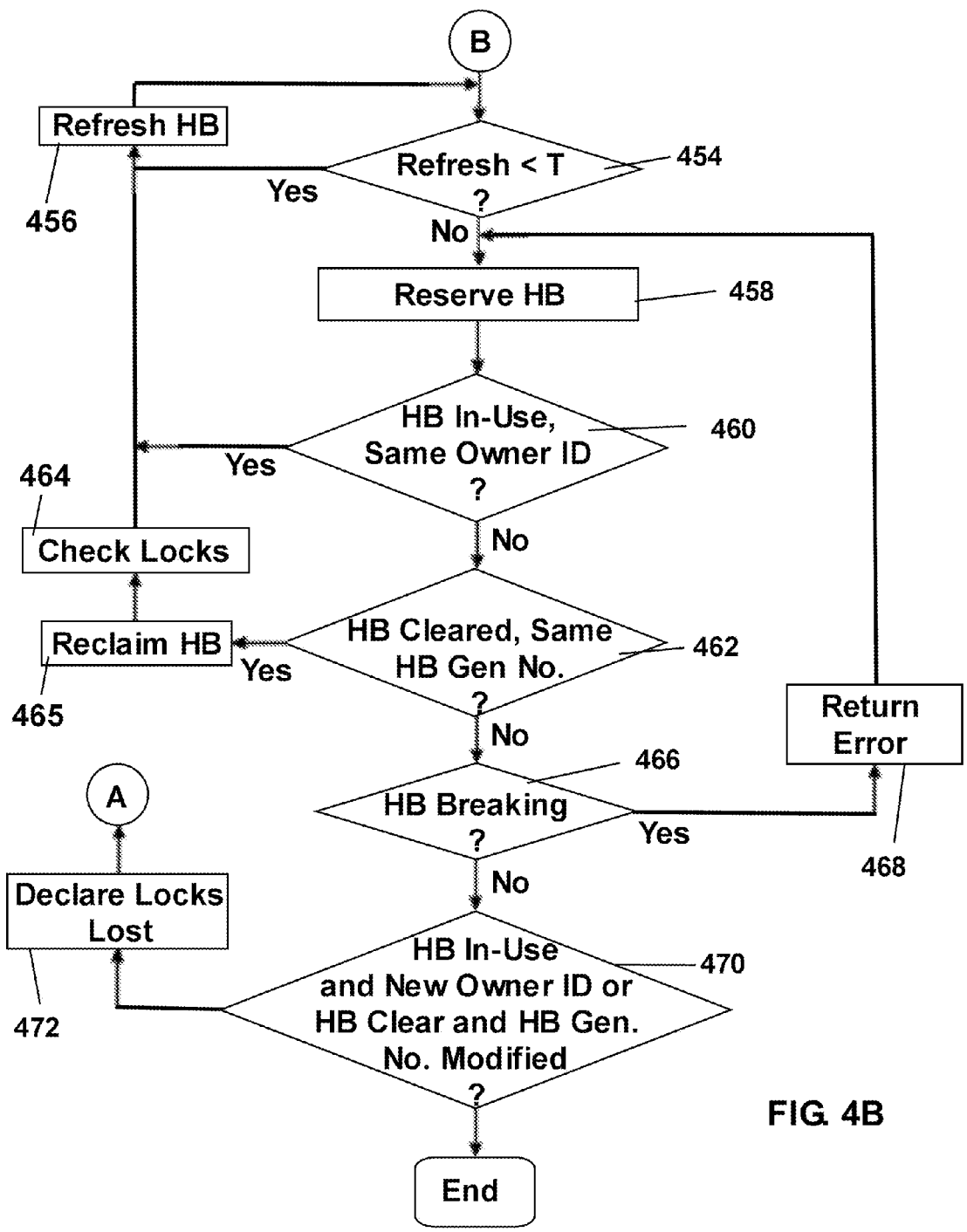

FIGS. 4A-B forms a flow diagram of the heartbeat allocation, renewal and reclaiming processes in accordance with the present invention. Referring to FIG. 4A, specifically, the process for allocation and initializing of a heartbeat is illustrated. A heartbeat is allocated dynamically within the heartbeat segment 340 when an instance of a node requires a lock or when the node "comes online". When a node wishes to allocate a heartbeat, it uses a mechanism, e.g. SCSI reservation to get exclusive access to the disk, as illustrated by process block 440. Next, the node searches heartbeat segment 340 for a heartbeat region 342 that is not currently in use, as illustrated by process block 442 and decisional block 444. If an unused heartbeat region 342 exists within heartbeat segment 340, the node initializes the fields therein, as illustrated by process block 446. When initializing a heartbeat region 342, the node stores an identifier which uniquely describes the node as the owner of the heartbeat within the system. Similarly, the node initializes the heartbeat state as "In-Use" and changes the pulse field value from its previous value or stores a value representing the current time into the pulse field. The node initializes the heartbeat generation number with a value that is typically an incremental difference from the last generation number value assigned to the same heartbeat region. Optionally, the other node-specific information field may be initialized and a heartbeat timeout interval may be entered if other than the system time constant T is to be used to calculate heartbeat expiration for that node.

Following system initialization, there may be few or no heartbeat regions allocated within heartbeat segment 340. At sometime thereafter, there may be multiple allocated heartbeat regions, including both live heartbeats and stale heartbeats. If no unused heartbeat region exists within heartbeat segment 340, a node will execute a garbage collection algorithm by searching for a stale heartbeat region, as illustrated by process block 448 and decisional block 450. The node will attempt to clear any heartbeat that is stale using the heartbeat clearance procedure 452. Such a process is outlined in greater detail with reference to the flowchart of FIGS. 5A-B. Typically, the garbage collection algorithm will examine the same fields as examined during the heartbeat clearance procedure, including any of the heartbeat state, pulse fields, heartbeat time out (time constant T), heartbeat generation number, and owner ID fields. To minimize the amount of searching performed by the heartbeat allocation algorithm a random value can be used to determine where to start searching for an unused heartbeat region. Alternatively, a hash function may be performed on a node identifier to determine where to start searching for an unused heartbeat region. Alternatively, heartbeat allocation may be performed using other techniques or variations of the technique disclosed herein. If the garbage collection algorithm frees up a heartbeat region for use, process flow returns to process block 446.

Heartbeat Renewal & Reclaiming Processes

Referring to FIG. 4B, the process for renewing a heartbeat in accordance with the present invention is illustrated by process blocks 454-456. Once allocated and initialized, a node renews its heartbeat by writing a new value to the pulse field of its respective heartbeat region within at most T seconds of the last time it renewed, as illustrated by decision block 454 and process block 456, where the "refresh" represents the time difference between the current time and the last time the heartbeat was renewed. In order to prevent loss of a heartbeat due to failure of a single renewal attempt, conservatively, the host node may renew more often than every T seconds, for example, every T/4 seconds. Given this example, the host node must fail at renewing its respective heartbeat four times before it is vulnerable to loss thereof. It will be obvious to those reasonably skilled in the relevant arts that any interval less than T may be used. The process loop of renewing the pulse field value of the relevant heartbeat region, illustrated by blocks 454 and 456, may continue indefinitely while the node is still viable within the system.

The inventive protocol defines processes by which a node may determine if its own heartbeat has become stale and a process for reclaiming the heartbeat and its associated locks. For each node, there is a time value T that defines the heartbeat timeout period, that is, the period after which if the node's heartbeat has not been renewed, it can be considered stale. In one implementation of the inventive system, there may be one time constant throughout the system. In an alternative embodiment, there may be a node-specific time constant stored in the node's heartbeat region. Given the heartbeat timeout T, the node can always determine if its heartbeat has become stale because it has not successfully updated the pulse in its heartbeat region in T seconds Once its heartbeat has timed out, a node must assume that its heartbeat may have been cleared by another node, and one or more of the locks it held stolen. Such node must thus go into a heartbeat reclaiming mode. In an alternative embodiment of the invention, the node owning a particular heartbeat may define a time constant T that is different from any default time constant T throughout the system. In this embodiment, a node which utilizes various resources located on storage which has different access times may define its own time constant within its respective heartbeat. In such scenario, the heartbeating node determines if its heartbeat has timed out if it has not successfully modified the pulse field within the threshold defined by the heartbeat timeout value. Other nodes determine if a node's heartbeat has timed out by observing no changes to the pulse field within the threshold defined by the heartbeat timeout value.

If in decisional block 454 it is determined that a node, O, failed to successfully write to the pulse field of its heartbeat (refresh) within T, node O can no longer assume it still owns its heartbeat or the associated locks. Instead, node O stops trying to renew its heartbeat and enters a heartbeat reclaiming mode. Node O reads its own heartbeat region using SCSI reservation for atomicity or some other mechanism, as illustrated by process block 458. If its heartbeat state is still "In-Use", and owned by O, then node O may renew the heartbeat while still under SCSI reservation, as illustrated by decisional block 460 and process block 456. Since the heartbeat was never cleared, all locks are still owned by O, and the lapse in heartbeat writing is without effect.

If upon examining its heartbeat state, node O finds the heartbeat in CLEAR state, but with an unchanged generation number that indicates that the heartbeat has not been re-used by another node, then node O may reclaim and re-initialize the heartbeat as illustrated by decisional block 462 and process block 465, and determine if some or all of its locks have been stolen, as illustrated by process block 464. If the lock(s) associated with the heartbeat have not been stolen, then the locks can continue to be used, since the heartbeat has been reclaimed. The process of determining whether locks have been stolen entails reading the lock data structures associated with the reclaimed heartbeat to determine if the owner ID field still designates node O and the heartbeat address and generation number still reference the reclaimed heartbeat. In addition, node O may have to resurrect some application-specific data structures associated with the heartbeat, such as a filesystem journal. To support lock verification, something such as a list or hash table of locks acquired through heartbeat by node O may be necessary. Alternatively, node O may delay verification of ownership of a lock until the next time that an operation that requires ownership of that lock is performed.

While a node is in heartbeat reclaiming mode, the node may defer or fail any operations that involve locks or operations, such as I/O, that depend on the holding of existing locks. In order to avoid spurious errors, such operations may be delayed until the heartbeat reclamation process is complete. If the original heartbeat can be reclaimed, then most delayed operations can be allowed to proceed without returning errors. Any operations that depend on locks that have been lost are typically failed.

If upon examining its heartbeat state, node O finds the heartbeat in the BREAKING state, node O waits a minimum duration of T, then re-reads its heartbeat. If the heartbeat remains in the BREAKING state and the Pulse field did not change, the node that was clearing node O's heartbeat may have crashed or lost its connection to the disk. Node O can thus reclaim its heartbeat by setting the state field to IN-USE and resuming heartbeat renewal. If the heartbeat remains in the BREAKING state and the Pulse field changed, node O returns a temporary error for any operation requiring a lock associated with the heartbeat, as illustrated by decisional block 466 and process block 468 and 458. If the heartbeat is in any other state than BREAKING, then node O takes the steps as described below.

If upon examining its heartbeat state, node O finds that the heartbeat generation number has advanced, then node O may declare all locks as lost, as illustrated by decisional block 470 and process blocks 472. If the heartbeat has been reused by another node, the heartbeat can't be reclaimed. Thereafter, node O attempts to allocate a different heartbeat region for its use, using a process described with reference to blocks 440-452, as illustrated by connector A to FIG. 4A. Alternatively, node O may omit declaring all locks as lost and try to re-direct all locks associated with the lost heartbeat to the new heartbeat that it allocates.

Heartbeat Clearing Process

Figure 5A:
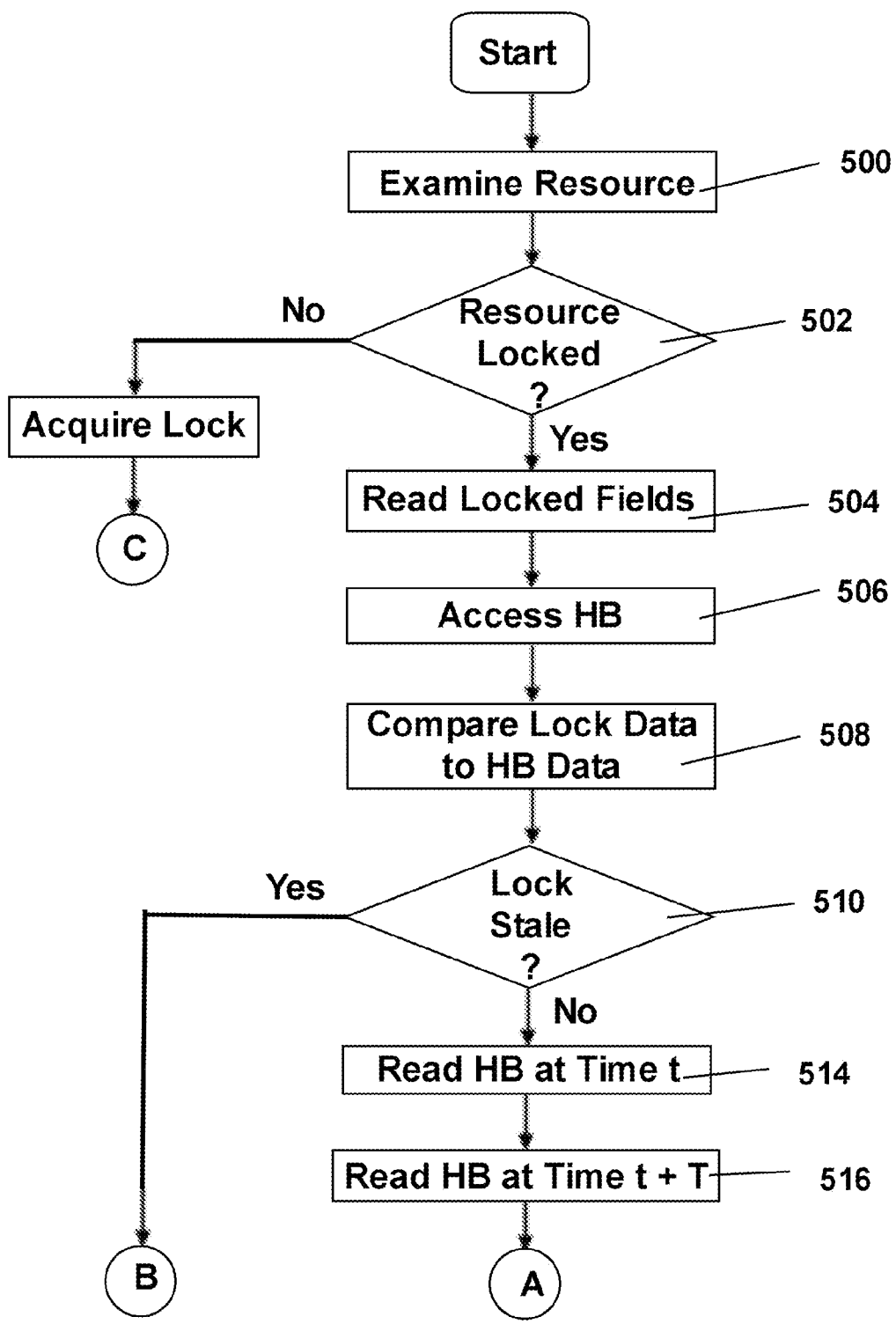
FIGS. 5A-B form a flow diagram of the processes utilized to ascertain lock validity, clear heartbeats and break locks in accordance with the present invention.
Figure 5B:
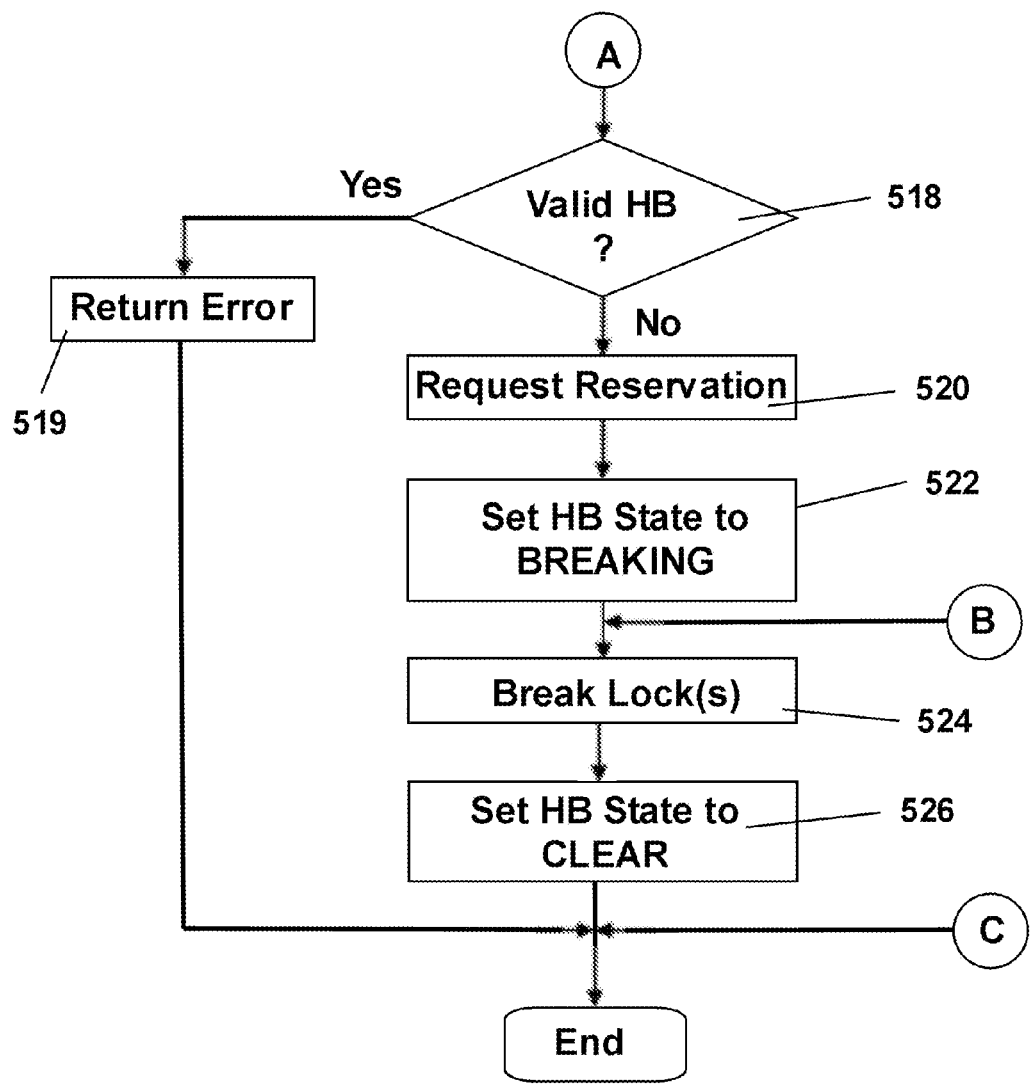

If the node does not renew the pulse field of its respective heartbeat within the heartbeat timeout T as defined earlier, another node that has observed that the heartbeat has not changed in T can "break" or clear the heartbeat and steal any locks associated with that heartbeat. Referring to FIGS. 5A-B, a flowchart of the process for breaking or clearing a heartbeat in accordance with the present invention is illustrated. First, in attempting to acquire the lock corresponding to a system resource, a node, N, attempts to reserve the storage on which the lock resides for atomicity of the locking operation e.g. using a SCSI reservation, and then determines if the lock is held, as illustrated by process block 500 and decisional block 502. If the lock is held, node N examines the Heartbeat Address and Heartbeat Generation Number in the lock, as illustrated by process block 504. The node N then accesses the indicated disk address within the heartbeat segment and reads the relevant heartbeat region, as illustrated by process block 506. If the Owner ID in the heartbeat region does not match the Owner ID in the lock (node O), or the Heartbeat Generation Number in the heartbeat region does not match the Heartbeat Generation Number in the lock, or the heartbeat state is CLEAR, then the lock is determined to be "stale", as illustrated by process blocks 508 and decisional block 510. In such an instance, the holder of the lock may have crashed without releasing the lock or may also have temporarily lost connection to the disk, and the heartbeat region has since been re-used or cleared. Node N may immediately send a reservation request using the SCSI reservation to get atomicity of the resource and then attempt to break the lock. If in process block 508 and decisional block 510, the owner id and heartbeat generation within the heartbeat region do match that contained within the lock, then node N must release the reservation between each iteration and then recheck if the owner node O is heartbeating. At a minimum, the node N must read the heartbeat region once at time t and then read it again at time t+T, more than (T seconds later), or, t+$T_n$ ($T_n$ seconds later, where $T_n$ is the time constant defined by a node for its specific heartbeat), as illustrated by process blocks 514 and 516. The node N that is trying to break a lock may want to check the heartbeat region a number of times with a variety of wait intervals, as long as node N doesn't break the heartbeat until it has observed that the heartbeat has not changed for the last T seconds. For instance, node N may re-read the heartbeat region at intervals of 1, 2, 4, 8, . . . seconds up to T seconds. With multiple re-reads of the heartbeat region while waiting, the node N may notice a changing heartbeat and give up on acquiring a held lock more quickly.

If the heartbeat region has changed within the duration of the heartbeat timeout, then the owner node O is still heartbeating and, therefore valid, and an error is returned to the process requesting the lock, as illustrated by decisional block 518 and process block 519. If the heartbeat region has not changed for the duration of the heartbeat timeout, then the owner node O is not heartbeating and, therefore, Node N can attempt to clear the heartbeat of O, by sending a reservation request using the SCSI reservation to get atomicity, as illustrated by decisional block 518 and process block 520. Thereafter Node N sets the heartbeat to a BREAKING state and can break the lock it is interested in, as illustrated by process blocks 522 and 524. In order to "break" a lock, node N overwrites the owner ID information of node O with its own owner ID information and similarly overwrites the heartbeat address and generation number fields within the lock with its own heartbeat address and generation number fields. When node N has broken the lock in which it is interested and performed any other related tasks, node N may then set the heartbeat state to CLEAR, as illustrated by process block 526. The BREAKING state allows a node to release the SCSI reservation while performing a long operation like journal replay, and yet prevent other nodes from also attempting to clear the heartbeat. While node N maintains the heartbeat in the BREAKING state, it must periodically change the Pulse field in the heartbeat being broken, in the same manner that it renews its own heartbeat.

In case node N loses connectivity to storage temporarily and is unable to update the Pulse field in the heartbeat being broken for the duration of the heartbeat's lease, it must assume that the heartbeat could have been reclaimed by its original owner, or another host could have started breaking it. So node N must restart the breaking process without making any assumptions about the state of the heartbeat on disk.

Also during the clearing procedure, node N may run any application or filesystem-specific code that is required, such as replaying the journal of node O, stored in the other node-specific information field of the heartbeat data structure, also as illustrated by process block 522. Such process is done after setting the heartbeat state to BREAKING but before setting it to CLEAR.

There could be multiple applications (processes) on a node N that wish to acquire on-disk locks. If those on-disk locks are apparently held by node O, then each application will potentially need to check the heartbeat of node O to see if the lock can be broken. In order to avoid redundant reads of node O's heartbeat and avoid potential races between the applications, a "heartbeat cache" which temporarily caches the content of read heartbeat regions may be established by the node N.

Such a heartbeat cache may be maintained in the local memory associated with each node. For example, if a node instance had recently attempted to clear or break three heartbeat regions, the data relating to those heartbeat regions may be stored locally.

Not shown specifically in flowcharts 4A-B and 5A-B are each of the individual reservation and release requests utilized by nodes through the SCSI reservation system to atomicity a resource, such steps being impliedly understood by those reasonably skilled in the arts in light of the disclosure herein.

Figure 6:
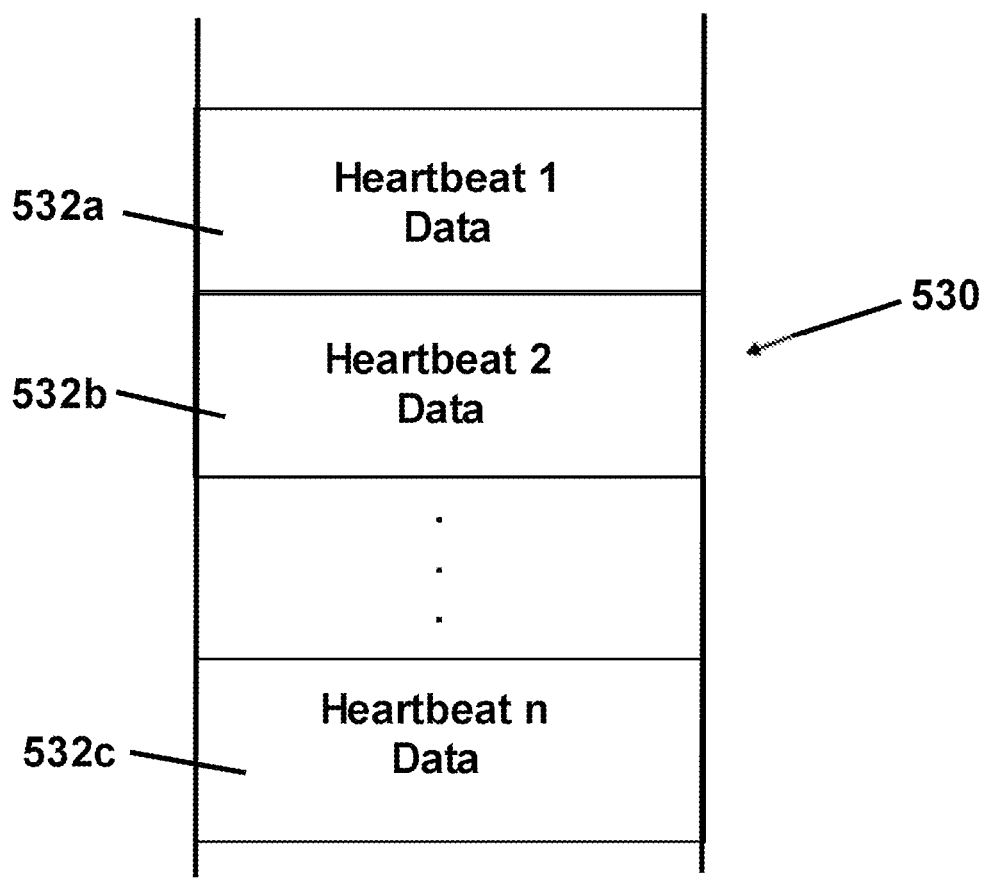
FIG. 6 illustrates conceptually the logical organization and relationship of a heartbeat cache in accordance with present invention.

FIG. 6 illustrates conceptually the logical organization of a heartbeat cache 530 in which cache entries 532a, 532b, . . . 532n may comprise all or a subset of the information from a heartbeat data structure 342 or any other information useful to the node to determine if the desired heartbeat has become stale or is being maintained by its respective owner. Such heartbeat cache eliminates redundant read attempts, and ensure that multiple processes do not concurrently try to clear a stale heartbeat.

Under certain circumstances, it may be desirable for a node N to dynamically change the heartbeat timeout period of its heartbeat. This can be achieved simply by writing out the new heartbeat timeout value to the heartbeat on disk. The new heartbeat timeout value should be immediately adopted for monitoring heartbeating failures and starting reclaims for the case when the heartbeat timeout is reduced. If the heartbeat timeout is increased from say T to T2, node N should still assume its heartbeat timeout to be T for a duration of at least T after changing the heartbeat timeout value on disk.

In light of the foregoing description, the reader can appreciate that the functionality disclosed herein may be implemented entirely or partially within an operating system whether in the traditional computer system or in a fully or partially virtualized computer system. For example, a virtual machine environment suitable for implementing the concepts of the present invention is the ESX Server virtualization product, or virtual operating system environment, commercially available from VMware, Inc. Palo Alto, Calif., with various functional aspects described here in distributed amongst the kernel 78, the VMM 92 and virtual machine 82. The functional algorithms described herein may be implemented as part of the operating system kernel for either a traditional physical system or a virtual machine implication. Particularly with a virtual machine implementation, the VM kernel may implement a virtual SCSI reservation mechanism.

Although the inventive concepts disclosed herein have been described with reference to specific implementations, many other variations are possible. For example, the inventive techniques and systems described herein may be used in both a hosted and a non-hosted virtualized computer system, regardless of the degree of virtualization, and in which the virtual machine(s) have any number of physical and/or logical virtualized processors. In addition, the invention may also be implemented directly in a computer's primary operating system, both where the operating system is designed to support virtual machines and where it is not. Moreover, the invention may even be implemented wholly or partially in hardware, for example in processor architectures intended to provide hardware support for virtual machines. Further, the inventive system may be implemented with the substitution of different data structures and data types, and resource reservation technologies other than the SCSI protocol. Also, numerous programming techniques utilizing various data structures and memory configurations may be utilized to achieve the results of the inventive system described herein. For example, the tables, record structures and objects may all be implemented in different configurations, redundant, distributed, etc., while still achieving the same results.

In addition to any of the foregoing alternative implementations, subject matter described herein may be implemented in either all software, all hardware, or a combination of hardware and software, including program code stored in firmware format to support dedicated hardware. A software implementation of the above described embodiment(s) may comprise a series of computer instructions either fixed on a tangible medium, such as a computer readable media, e.g. diskette, CD-ROM, or disks, such as storage systems 16 of FIGS. 1A-B, or transmittable to a computer system in a carrier wave, via a modem or other interface device, such as a communications adapter connected to the network over a medium. Such medium may be either a tangible medium, including but not limited to optical or analog communications lines, or may be implemented with wireless techniques, including but not limited to microwave, infrared or other transmission techniques. The series of computer instructions, whether contained in a tangible medium or not, embodies all or part of the functionality previously described herein with respect to the invention. Those skilled in the art will appreciate that such computer instructions can be written in a number of programming languages for use with many computer architectures or operating systems and may exist in machine executable format. Further, such instructions may be stored using any memory technology, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, preloaded with a computer system, e.g., on system ROM or fixed disk, or distributed from a server or electronic bulletin board over a network, e.g., the Internet or World Wide Web.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. Further, the methods of the invention may be achieved in either all software implementations, using the appropriate processor instructions, or in hybrid implementations which utilize a combination of hardware logic and software logic to achieve the same results.

What is claimed is:

1. In a computer system having a plurality of shared resources accessible to a plurality of nodes, a method comprising:
    (A) allocating heartbeat data structures to the nodes such that unique associations are defined between individual nodes and individual heartbeat data structures that include heartbeat information of the individual nodes;
    (B) identifying a grant of a lock associated with one of the shared resources, the grant being to a specific node that is uniquely associated with a specific heartbeat data structure, the lock having an identification of the specific heartbeat data structure with which the specific node is uniquely associated, wherein the grant identifies the specific node as owner of the lock for gaining access to the shared resource;
    (C) determining if the owner is renewing the specific heartbeat data structure; and
    (D) modifying the lock to disassociate the owner from the shared resource if the owner is not renewing the specific heartbeat data structure.

2. The method of claim 1 further comprising:
    (E) modifying a state value associated with the specific heartbeat data structure if the owner has failed to renew the specific heartbeat data structure.

3. The method of claim 1 further comprising:
    (E) modifying a state value associated with the specific heartbeat data structure if the owner has failed to renew the specific heartbeat data structure within a predetermined threshold.

4. The method of claim 3 wherein the predetermined threshold represents a time period that is constant for all heartbeats within the system.

5. The method of claim 3 wherein the predetermined threshold represents a time period definable by the owner.

6. The method of claim 1 wherein the lock is maintained in a lock data structure associated with the shared resource, wherein the lock data structure includes address data identifying a location of a particular heartbeat data structure uniquely associated with a current owner of the lock, and wherein (D) comprises:
    (D1) modifying the address data for gaining access to the shared resource.

7. The method of claim 1 wherein the lock is maintained in a lock data structure associated with the shared resource and wherein (D) comprises:
    (D1) modifying within the lock data structure, owner data identifying a current owner of the lock.

8. The method of claim 1 wherein the specific heartbeat data structure is uniquely associated with the owner and the contents of the heartbeat data structure comprise:
    (i) owner data identifying a current owner of the specific heartbeat data structure;
    (ii) state data identifying a current state of the specific heartbeat data structure; and
    (iii) pulse data identifying a renewal value of the specific heartbeat data structure.

9. In a computer system having a plurality of shared resources accessible by a plurality of nodes, a method comprising:
    (A) maintaining a first lock data structure associated with a first shared resource and a specific heartbeat data structure that includes heartbeat information of one of the plurality of nodes and is stored on a disk on which a plurality of other heartbeat data structures are also stored,
    (B) maintaining a second lock data structure associated with a second shared resource and the specific heartbeat data structure, wherein maintaining the first and second lock data structures includes providing an identification of the specific heartbeat data structure within each of the first and second lock data structures, and
    (C) modifying at least one of the first and second lock data structures if no modifications to the heartbeat data structure occur within a predetermined threshold, including disassociating the at least one of the first lock data structure and the second lock data structure from the specific heartbeat data structure.

10. A computer program product for use with a computer system having a plurality of shared resources, the computer program product comprising a non-transitory computer readable medium having embodied therein program code comprising:

(A) program code for allocating heartbeat data structures to the nodes such that unique associations are defined between individual nodes and individual heartbeat data structures that include heartbeat information of the individual nodes;

(B) program code for identifying a grant of a lock associated with one of the shared resources and for associating the lock with a specific heartbeat data structure, wherein the grant identifies a specific node as owner of the lock for gaining access to the shared resource, such that the lock has an identification of the specific heartbeat data structure with which the specific node is uniquely associated;

(C) program code for determining if the owner is renewing the specific heartbeat data structure; and (D) program code for modifying the lock to disassociate the owner from the shared resource if the owner is not renewing the specific heartbeat data structure.

11. In a computer system having a plurality of shared resources, a method comprising:

(A) maintaining in common storage a plurality of heartbeat data structures such that each heartbeat data structure includes heartbeat information of one of a plurality of nodes and is configured for allocation of current ownership to any one of the plurality of nodes, each heartbeat data structure for which current ownership is allocated to a particular node having content comprising:
  (i) owner data identifying a current owner of the heartbeat data structure;
  (ii) state data identifying a current state of the heartbeat data structure; and
  (iii) pulse data identifying a time of last renewal of the heartbeat data structure by the current owner; and (B) allowing the heartbeat data structure to be modified if the pulse data is not changed within a predetermined threshold, including enabling changes of the owner data identifying the current owner, wherein at least one of the maintaining in the common storage the plurality of heartbeat data structures and the allowing the heartbeat data structure to be modified is executed by a processor.

12. The method of claim 11 wherein the content further comprises:
  (iv) generation data indicative of a number of times the heartbeat data structure has had a change in current ownership.

13. The method of claim 12 further comprising:

(C) maintaining a lock data structure associated with one of the shared resources, the lock data structure comprising:
  (i) data identifying a specific heartbeat data structure, thereby associating the lock data structure with the specific heartbeat data structure.

14. The method of claim 13 wherein the data identifying the specific heartbeat data structure comprises one of owner data identifying a current owner of the specific heartbeat data structure and address data identifying a location of the specific heartbeat data structure.

15. The method of claim 13 wherein the lock data structure further comprises:
  (ii) generation data indicative of the generation data of the specific heartbeat data structure.

16. The method of claim 13 wherein (B) further comprises:

(B1) allowing one of the state data and owner data identifying a heartbeat data structure to be modified if the pulse data is not changed within a predetermined threshold.

17. In a computer system having a plurality of shared resources, a method comprising:

(A) maintaining a lock data structure such that the lock data structure is associated with a specified shared resource and is associated with a specified heartbeat data structure that includes heartbeat information of a node, the heartbeat data structure having a state value associated therewith, the lock data structure comprising:
  (i) owner data identifying a current owner of the lock data structure and the heartbeat data structure;
  (ii) address data identifying a location of the heartbeat data structure; and
  (iii) generation data indicative of a re-allocation of the heartbeat data structure; and (B) allowing one of the owner data and address data of the lock data structure to be modified if the state value of the heartbeat data structure is modified, wherein at least one of the maintaining the lock data structure and the allowing one of the owner data and address data of the lock data structure to be modified is executed by a processor.

18. The method of claim 17 wherein the lock data structure further comprises:
  (iv) lock type data identifying a type of lock with which the shared resource is associated.

19. The method of claim 1, wherein the specific heartbeat data structure includes a heartbeat generation number that indicates the number of times a disk region on which the specific heartbeat data structure resides has been initialized.

20. The method of claim 19, wherein the heartbeat generation number is incremented each time the disk region is allocated to a node.

21. The method of claim 1, wherein the lock is maintained in a data structure that is linked to the specific heartbeat data structure.

22. The method of claim 21, wherein the data structure that is linked to the specific heartbeat data structure includes a pointer that points to a disk region on which the specific heartbeat data structure resides.

23. The method of claim 1, wherein a single heartbeat data structure is maintained for all locks associated with one of the plurality of nodes.

24. The method of claim 1, wherein only a single heartbeat data structure is maintained for all locks associated with one of the plurality of nodes.

25. The method of claim 9, wherein a lock is maintained in the first lock data structure associated with the first shared resource or the second lock data structure associated with the second shared resource, wherein the first lock data structure or the second lock data structure includes address data identifying a location of a particular heartbeat data structure uniquely associated with a current owner of the lock, and wherein the method further comprises modifying the address data for gaining access to the first shared resource or the second shared resource.

26. The computer program product of claim 10, wherein the lock is maintained in a lock data structure associated with the shared resource, wherein the lock data structure includes address data identifying a location of a particular heartbeat data structure uniquely associated with a current owner of the lock, and wherein (D) comprises:
  program code for modifying the address data for gaining access to the shared resource.

27. The method of claim 11, wherein a lock is maintained in a lock data structure associated with one of the shared resources, wherein the lock data structure includes address data identifying a location of a particular heartbeat data structure uniquely associated with a current owner of the lock, and wherein the method further comprises modifying the address data for gaining access to the one of the shared resources.

* * * * *